US006231930B1

(12) United States Patent
Klebanoff

(10) Patent No.: US 6,231,930 B1
(45) Date of Patent: May 15, 2001

(54) PROCESS FOR PRODUCING RADIATION-INDUCED SELF-TERMINATING PROTECTIVE COATINGS ON A SUBSTRATE

(75) Inventor: Leonard E. Klebanoff, Dublin, CA (US)

(73) Assignee: EUV LLC, Santa Clara, CA (US)

( * ) Notice: Subject to any disclaimer, the term of this patent is extended or adjusted under 35 U.S.C. 154(b) by 0 days.

(21) Appl. No.: 09/470,670

(22) Filed: Dec. 23, 1999

Related U.S. Application Data

(60) Provisional application No. 60/154,144, filed on Sep. 15, 1999.

(51) Int. Cl.[7] .......................................................... C08F 2/46

(52) U.S. Cl. ........................ 427/488; 427/162; 427/255.6; 427/385.5; 427/496; 427/497; 427/508; 427/509; 427/523; 427/533; 427/551; 427/554; 427/558; 427/559

(58) Field of Search ..................................... 427/488, 497, 427/509, 523, 533, 551, 554, 558, 559, 162, 255.6, 385.5, 496, 508

(56) References Cited

FOREIGN PATENT DOCUMENTS

4003882 A1 * 8/1991 (DE) .

* cited by examiner

*Primary Examiner*—Bernard Pianalto
(74) *Attorney, Agent, or Firm*—D. A. Nissen

(57) ABSTRACT

A gas and radiation are used to produce a protective coating that is substantially void-free on the molecular scale, self-terminating, and degradation resistant. The process can be used to deposit very thin (≈5–20 Å) coatings on critical surfaces needing protection from degradative processes including, corrosion and contamination.

10 Claims, 5 Drawing Sheets

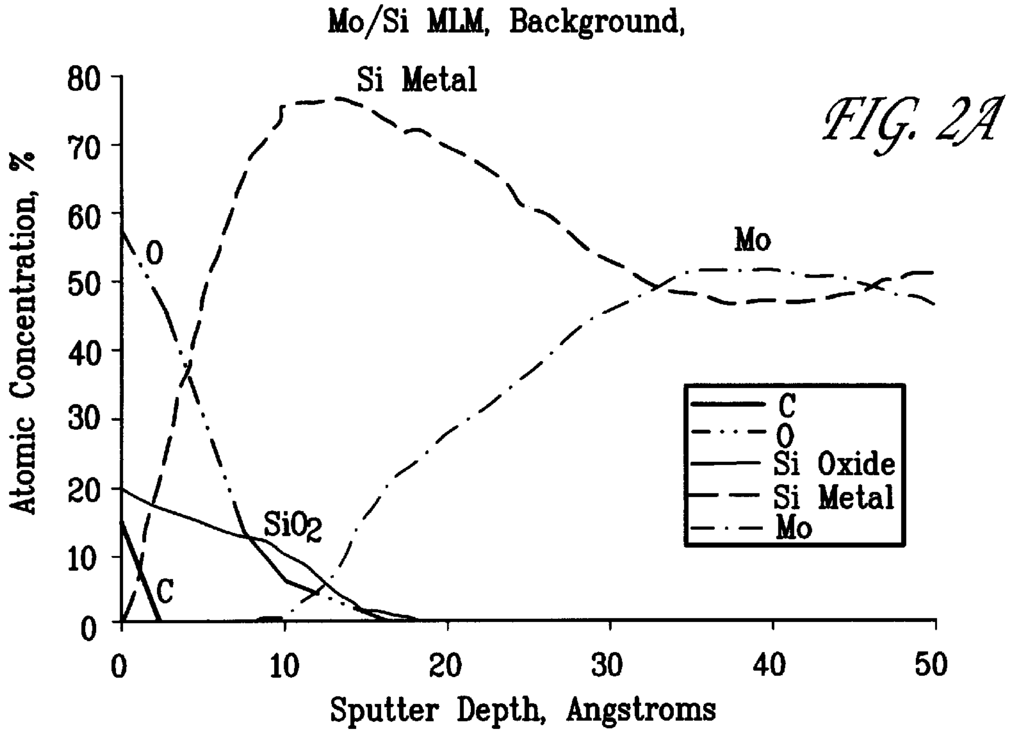
*FIG. 2A*
*FIG. 2B*
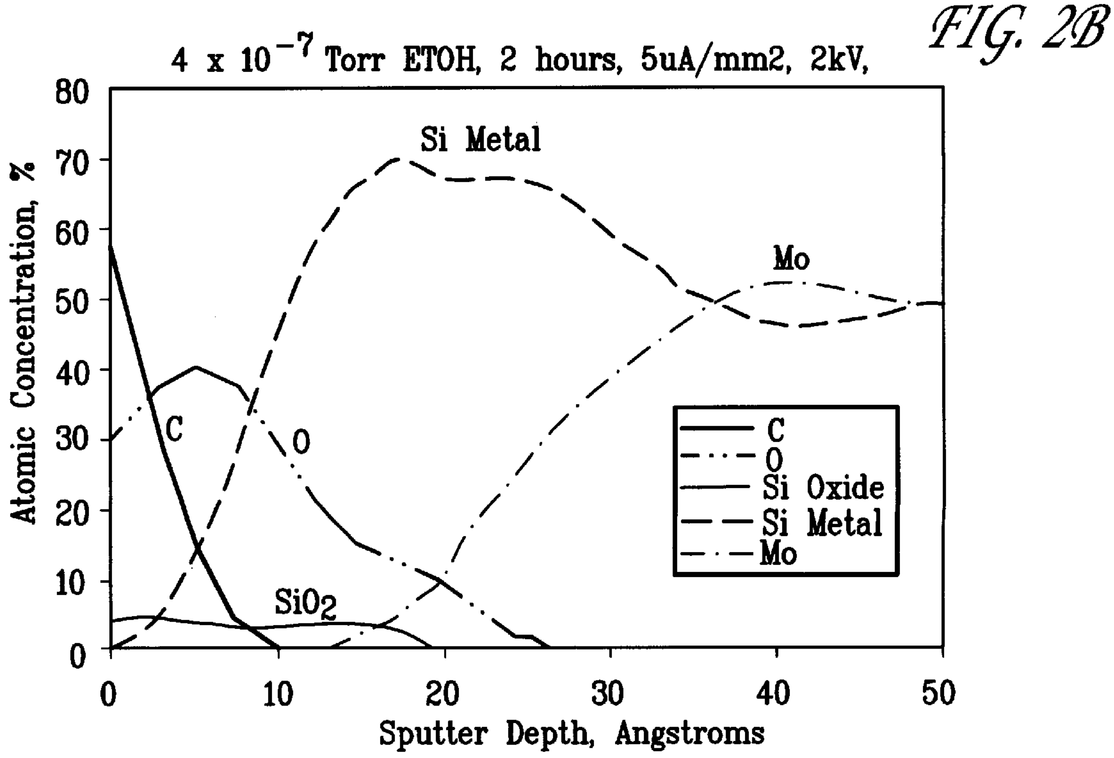

PROCESS FOR PRODUCING RADIATION-INDUCED SELF-TERMINATING PROTECTIVE COATINGS ON A SUBSTRATE

CROSS-REFERENCE TO RELATED APPLICATIONS

This application claims benefit of U.S. Provisional Application No. 60/154,144, filed Sep. 15, 1999 having the same title.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to a method for providing void-free, protective coatings for surfaces and in particular for optical surfaces used for lithographic applications and subject to high energy radiation fluxes. In addition to being substantially void-free on a molecular level, the coatings produced by the method described herein are self-terminating so that the coatings are typically less than about 20 Å thick.

There is a need in current technology to protect critical surfaces from degradation including corrosion and contamination. As technology progresses, the amount of surface degradation that can be tolerated usually becomes smaller, and more difficult to achieve. This is particularly true for advanced or next generation lithography where the goal is to produce circuits whose critical dimensions are below 0.1 μm. The capabilities of conventional photolithographic techniques have been severely challenged by the need for circuitry of increasing density and higher resolution features. The demand for smaller feature sizes has inexorably driven the wavelength of radiation needed to produce the desired pattern to ever-shorter wavelengths. As the wavelength of the applied radiation is made shorter the energy of the radiation becomes greater, to the point where the radiation can cause the decomposition of molecules adsorbed on or proximate to a surface to produce reactive species that can attack, degrade, or otherwise contaminate the surface.

While short wavelength (high energy) radiation can directly dissociate molecules, secondary electrons, created by the interaction of this radiation with surfaces, are the primary agents for molecular dissociation. Low energy (5–10 eV) secondary electrons are known to be very active in breaking chemical bonds by direct ionization of adsorbed molecules or by electron attachment, wherein a secondary electron binds to a molecule producing a reactive negative ion that then de-excites to a dissociated product. Any type of radiation (photons, electrons, ions, and particles) that is energetic enough to liberate electrons can create secondary electrons; typically, energies of about 4–5 eV are required. Consequently, radiation-induced contamination, i.e., contamination of surfaces by reactive species produced by secondary electrons originating from radiative interactions, will most certainly occur in lithographic processes that use energetic radiation such as: extreme ultraviolet lithography (photon energy≈100 eV), projection electron lithography (electron energy≈50–100 keV), ion beam lithography (ion energy>10 keV), 193 nm lithography (photon energy≈6.4 eV) and 157 nm lithography (photon energy≈7.9 eV). Thus, the potential for contamination of critical lithographic components, such as masks and optical surfaces, and degradation of their operational capability is present in all the advanced lithographic processes. Moreover, to make circuits with critical dimensions below 0.1 μm, the figure and smoothness of the lithographic optical elements must be maintained at the nanometer level and below. This requires mitigation of degredative processes at nearly the atomic level. Future manufacturing technology (particularly for the semiconductor industry) therefore will require the application of protective coatings that have the following attributes:

1) Any coating that is applied must be resistant to contamination processes in general, and "high energy" degradative processes in particular. For example, future lithographic manufacturing processes can be expected to employ ionizing radiation, which will produce highly reactive species that can attack the coating.

2) The coating must be void-free on the molecular level in order to provide protection against processes that produce damage on the molecular size scale. If the shape and roughness of a lithographic optic is to be maintained below 1 nm (10 Å), molecular-sized degradation must be prevented.

3) The coating process must have a wide process window allowing coating application with a variety of techniques, under a variety of circumstances, and in as flexible a manner as possible.

4) Protection must be achieved with as thin a coating as possible, preferably with thickness below 20 Å. In optical applications, thin coatings avoid undesirable radiation absorption that would lower manufacturing throughput. Thin coatings also maintain optic figures and roughness specifications, with accuracy at the nanometer level.

Current methods of producing coatings on surfaces do not satisfy these requirements. For example, 20 Å thick coatings created by methods known in the art such as ion sputtering, arc deposition, laser ablation, or electrochemical plating usually possess voids of dimension ~5–10 Å. These voids arise because these techniques generate ~20 Å diameter particles that cannot coalesce completely at the molecular level. As a result, coatings based on these techniques allow molecular-sized corrosive species to penetrate to the critical surface and damage it.

SUMMARY OF THE INVENTION

The present invention provides a novel method for applying protective coatings to surfaces. These coatings are unique in not only being void-free at the molecular level but also they are resistant to degradative processes caused by high energy radiation and are self-terminating, having thickness that are typically below 20 Å. The very thin but highly protective coatings that are produced by the disclosed process can find application in any field of technology that requires protection of surfaces that have high figure, roughness, and spatial tolerance requirements such as micromachines, automotive applications, and advanced lithography.

Accordingly, a gas is introduced into the environment of the surface to be protected. The gas comprises a molecular species that because of its structure or composition (i.e., the presence of an appropriate functional group or groups on the molecule) can adsorb (or be bound) directly onto the surface to be protected. Exposure to a radiation flux causes the adsorbed (bound) molecular species to dissociate into reactive fragments that remain bound to the surface. Subsequently, the dissociated and reactive species couple together to form a uniform layer or film that is void-free on the molecular level.

BRIEF DESCRIPTION OF THE DRAWINGS

FIGS. 2A–2B show the sputter Auger profile of the Si surface of an untreated Mo/Si multilayer mirror and one exposed to 2 kV electrons and ethanol vapor.

DETAILED DESCRIPTION OF THE INVENTION

Figures 1A, 1B, 1C:
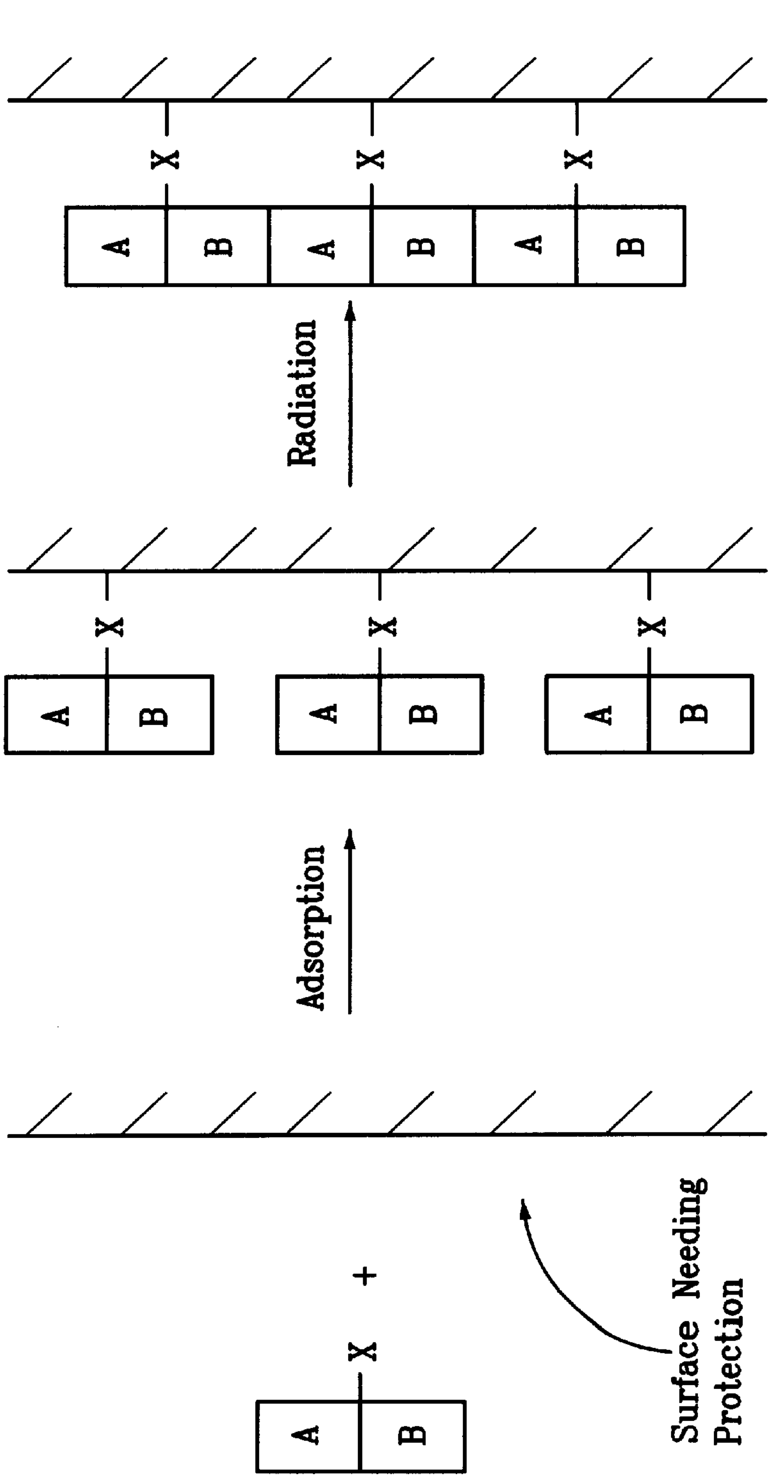
FIGS. 1A–1C illustrate the process of the present invention.

The process of the present invention is illustrated and exemplified by reference to FIGS. 1A, 1B and 1C. FIG. 1A depicts a substrate surface 110 exposed to a molecule ABX, that is preferably a gas and most preferably a hydrocarbon gas, wherein the term "hydrocarbon" refers to any carbon containing species. For purposes of discussion and to illustrate the principles of this invention the molecules that comprise the molecular species used to provide the surface coating can be described generally as ABX, however, it is contemplated that the molecule can take other forms. The X in the molecule ABX indicates a functional group that binds to the substrate surface and can be any chemically active functional group, such as —OH, —SH, —COOH. The identity of X will depend on the application and the nature of the substrate, but is chosen to provide strong chemisorptive bonding between the molecule ABX and the surface to be coated. The letters A and B depict a portion(s) of the molecule ABX not involved in the surface binding process and y indicates that the moiety AB, which is generally more formally written $(AB)_y$, can be repetitive. In contrast to the portion of the molecule designated by X, it is desired that the AB portion of the molecule have weak bonding interactions with the substrate. It should be noted that throughout the written description of this invention the terms "bind", "binding", "bond", "bonding" and "adsorb" as well as will be used interchangeably and synonymously. With reference to surfaces the terms "mirror' and "optic" can be used interchangeably and synonymously.

As indicated in FIG. 1B, the molecule ABX is bound to or adsorbed to the surface via the functional group X. In this configuration, the molecular portion AB is considered to be oriented proximate the surface, and forms the beginnings of a protective layer. The configuration, as depicted by FIG. 1B, does not yet constitute a protective layer because there can be molecular sized gaps between the AB moieties. Such gaps would leave the surface susceptible to molecular level attack. A second requirement of the AB portions of the molecule is that they be susceptible to radiation-induced dissociation and coupling. While short wavelength (high energy) radiation can directly dissociate molecules, secondary electrons, created by the interaction of this radiation with surfaces, are considered to be the primary agents for molecular dissociation.

Exposure to a high energy radiation flux can cause the individual $AB_y$ groups to dissociate, preferably by reaction with secondary electrons ejected from the bonding surface, and couple to each other, as depicted by FIG. 1C, forming an ABABAB layer substantially free from any gaps or interstices. The notation ABABAB is used only to denote the association of A and B moieties and as such will be used throughout the description of the invention for convenience to denote the surface coating layer. This notation does not necessarily depict either the structure of the coating layer, or arrangement of the A and B moieties within the layer, or their form, which may have changed as a consequence of secondary electron interactions. An additional requirement of the species A and B is that when these species are coupled together in the coating ABABAB they do not bond well to the functional group X or the moieties A or B of an incident ABX molecule. These requirements make the growth of the protective layer ABABAB "self-terminating" after a very thin layer is produced, since succeeding ABX molecules cannot easily bond to the established ABABAB layer. The thickness of the coating is essentially determined by how poorly the functional group X of succeeding ABX molecules can bond to the developing ABABAB coating so that the films ABABAB are generally self-terminated at the monolayer level and generally within 10–20 Å. Finally, the moieties A and B are chosen such that the ABABAB layer is resistant to contamination or degradation.

The inventive process having been described, it will be appreciated that since the coating process is a molecular-scale event (i.e. the binding of a molecule to the surface followed by the radiation-induced coupling of nearest-neighbor molecular moieties AB), the resulting film is substantially void free at the molecular level. Further, since the production of the protective film ABABAB . . . is self-terminating, essentially the same film thickness can be produced with a wide variety of partial pressures of the molecular precursor ABX and a large range of radiation fluxes. This provides for a wide process window, and flexibility in applying the coating. Any kind of radiation (photons, electrons, ions, particles, etc.) may be used, so long as the radiation can lead to the desired coupling reaction.

While the process of the present invention is now illustrated by application to coating of optic surfaces used in extreme ultraviolet (EUV) lithography, its use is not limited to lithographic operations but is contemplated to be applicable to surfaces generally.

EUV lithography employs reflective optics or mirrors to pattern the image of a mask onto a wafer. The mirrors consist of alternating layers of various elemental compositions such as Mo/Si, Mo/Be, etc. For a Mo/Si mirror a terminating layer of Si≈40 Å thick is generally applied as the final layer. When the terminal Si layer is exposed to radiation in the presence of even small amounts of water vapor, the entire Si surface is catastrophically and irreversibly oxidized to $SiO_2$, severely damaging its reflective properties.

The examples below will illustrate the inventive process by applying a protective carbon coating to the terminating Si surface of a Mo/Si mirror. Initially, it is necessary to select the molecular species that will be used to provide the coating for the Si surface. It is known in the art that silanol groups (Si—OH) typically terminate Si surfaces. Consequently, to enable the ABX molecule to bind to the hydroxy group of the surface silanols it is desirable that X be OH. It is further desirable that the molecule be reasonably volatile and that there be only a weak interaction between the hydroxy groups of subsequently arriving ABOH molecules and the ABABAB film so that the film will be self-terminating. Moreover, the AB moiety should be capable of dissociating and self-coupling under the influence of radiation flux. Based on the criteria above the molecule $CH_3CH_2OH$ (ethanol) was chosen as the reactive species.

EXAMPLE 1

The Si-terminating layer of a Mo/Si mirror was exposed to an electron beam having a current density of about 5 $\mu A/mm^2$ in the presence of ethanol vapor at a pressure of about $4\times10^{-7}$ Torr for about 2 hrs. The result of this exposure is shown in FIG. 2B. By comparison with the sputter Auger profile of the initial surface of a Mo/Si mirror (FIG. 2A), it can be seen that the radiation-induced decomposition of ethanol on the Si surface has resulted in the formation of a carbon film having a thickness of about 10 Å (FIG. 2B). There is no increase in the amount of $SiO_2$ present on the surface, as would be normally expected due to the presence of residual quantities of water vapor in the system.

EXAMPLE 2

Figure 3:
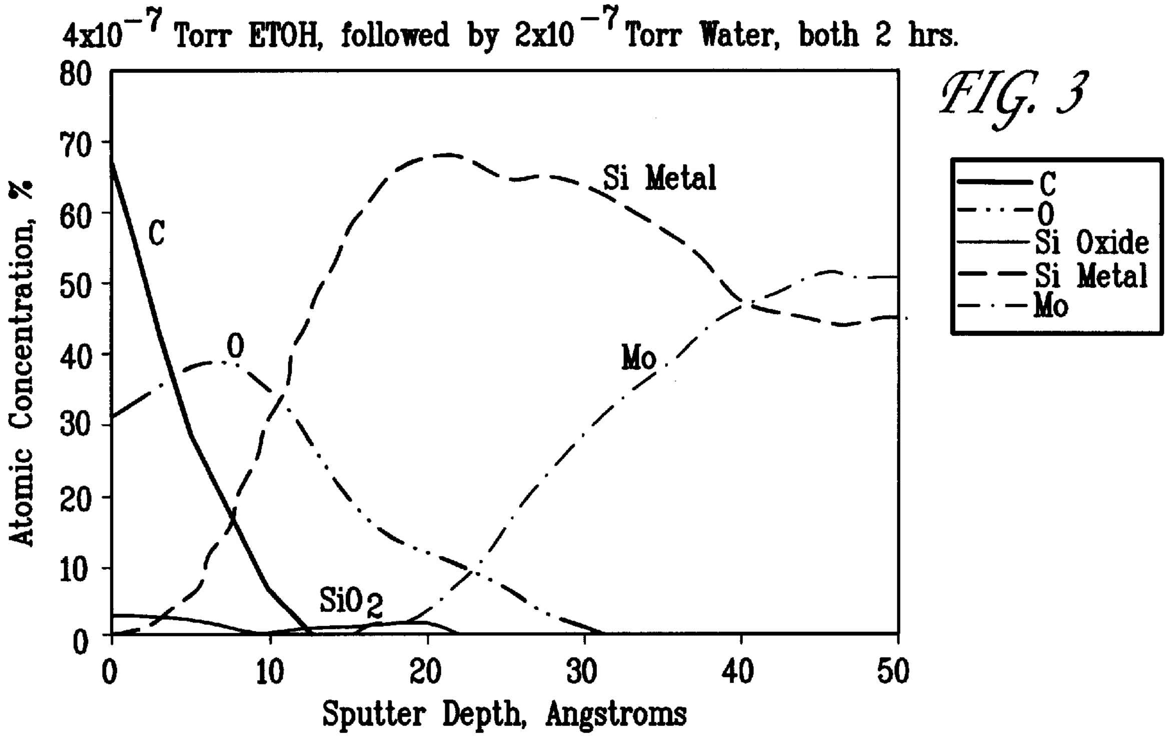
FIG. 3 shows the effect of a 10 Å layer of carbon applied by the present process in preventing substrate oxidation caused by water/radiation exposure.
Figure 4:
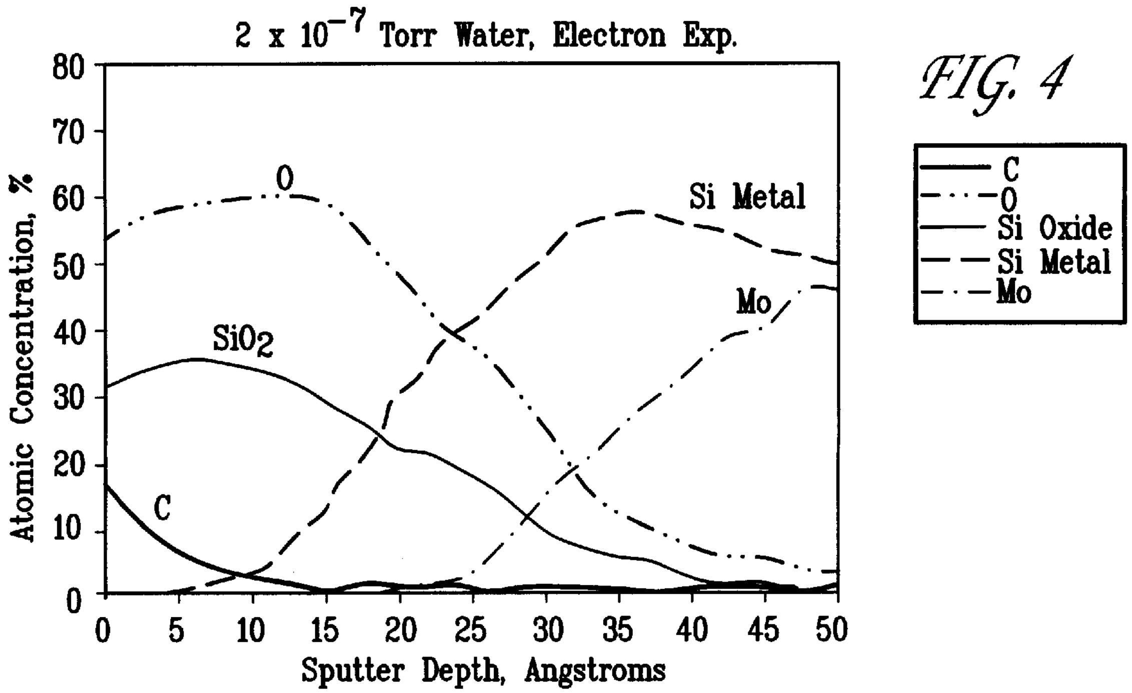
FIG. 4 is the sputter Auger profile of a Si surface exposed to water vapor and 2 kV electron radiation.

A surface coated with about 10 Å of carbon, as described in Example 1, was exposed to $2\times10^{-7}$ Torr water vapor for 2 hours at an electron beam current of about 5 $\mu A/mm^2$ at a beam energy of 2 kV. The result of this exposure is shown in FIG. 3. It can be seen by comparison of FIGS. 2B and 3 that neither the O nor the $SiO_2$ concentration on the surface has increased and the initial carbon layer remains unaffected. This result demonstrated that the carbon layer produced by radiation-induced decomposition of ethanol vapor provided a protective layer that effectively resisted water vapor oxidation. The effectiveness of this protective layer is further demonstrated by comparison with FIG. 4 which shows the sputter profile of a bare Si surface exposed to $2\times10^{-7}$ Torr water vapor under the same excitation conditions as for FIG. 3. The unprotected Si surface shows strongly enhanced levels of oxygen and $SiO_2$ in the topmost 35 Å of the surface. Moreover, the reflectivity for 13.4 nm light has dropped from 67.1% to 65.6%. Further, the inventor has shown that the carbon coating produced by the radiative decomposition of ethanol is stable to prolonged exposure to atmospheric air. Carbon coatings exposed to atmospheric air for about 5 months displayed essentially identical Auger sputter profiles as freshly prepared coatings, indicating no degradation, contamination or aging with air exposure.

EXAMPLE 3

Figure 5A:
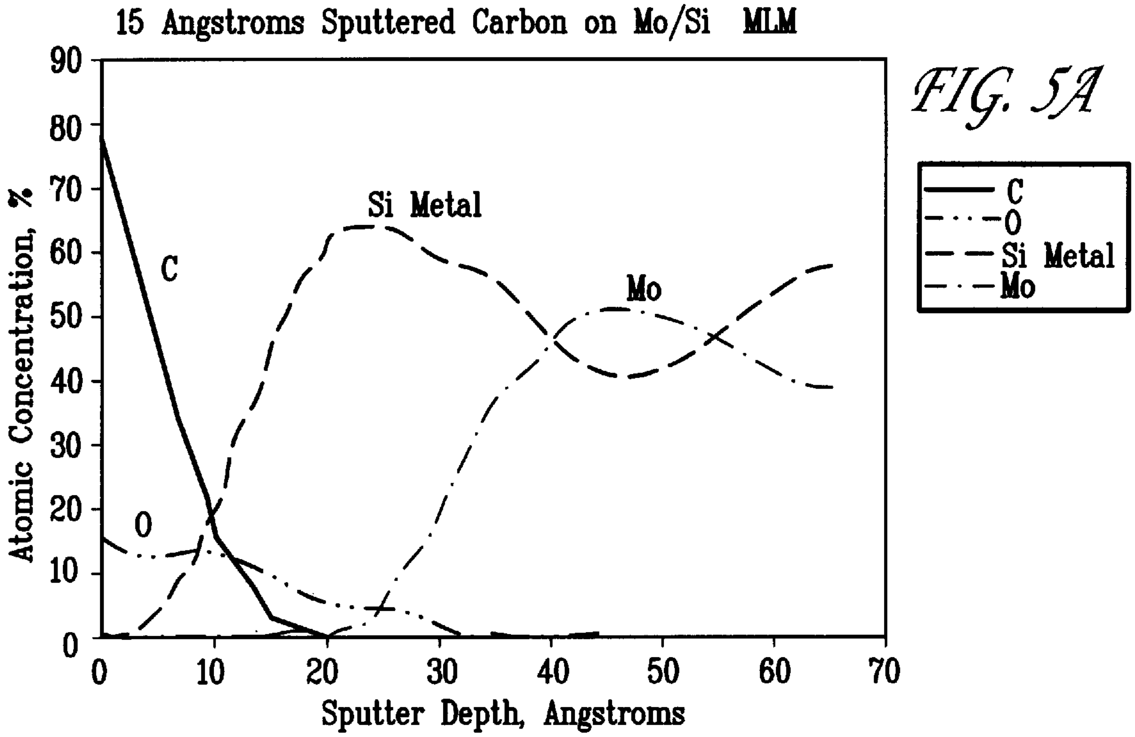
FIG. 5A shows the sputter Auger profile of a Mo/Si optic, coated with about 15 Å of sputtered carbon.
Figure 5B:
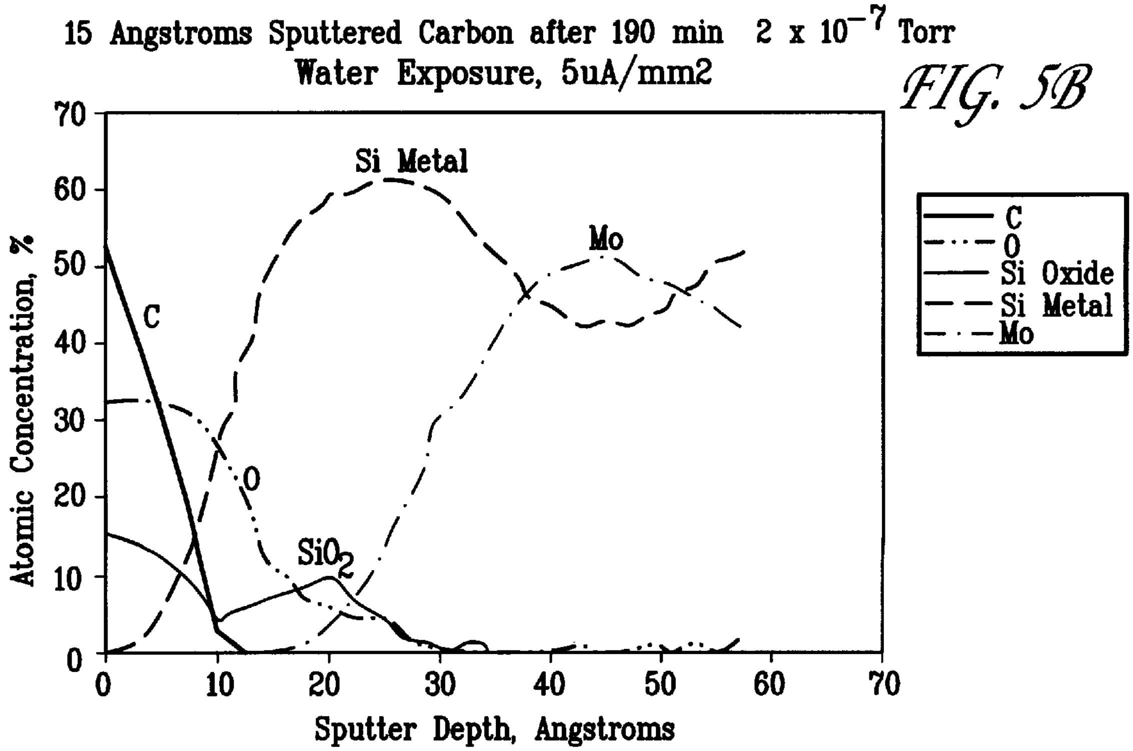
FIG. 5B shows the surface of FIG. 5A after exposure to electrons and water vapor.

The purpose of this example was to compare the protective abilities of a carbon coating produced by the inventive method with one produced by sputter coating a Si surface with a layer of carbon. FIG. 5A shows the Auger depth profile of a Mo/Si optic that has had about 15 Å of carbon sputtered onto its surface. FIG. 5B is the depth profile of the optic shown in FIG. 5A after being exposed to $2\times10^{-7}$ Torr water vapor and 2 kV electrons for 190 minutes. By comparing FIGS. 5A and 5B it can be seen simultaneous exposure to electrons (radiation) and water vapor results in a loss of surface carbon, the formation of an appreciable layer of $SiO_2$, and an increase in the oxygen content of the surface layer. It is believed that the inability of the sputtered layer of carbon to adequately protect the Si surface from oxidation is a result of the presence of molecular-sized voids in the sputtered carbon film that are inherently produced by the process of sputtering. These voids allow water molecules to bind to the optic surface and become dissociated by secondary electrons. Once dissociated, the reactive oxygen species can oxidize the optic, or react with the sputtered carbon layer to form volatile CO or $CO_2$ products, thereby removing the sputtered carbon layer from the surface. As has been shown above, such voids are not present in the carbon film produced by the method described here.

EXAMPLE 4

Figure 6A:
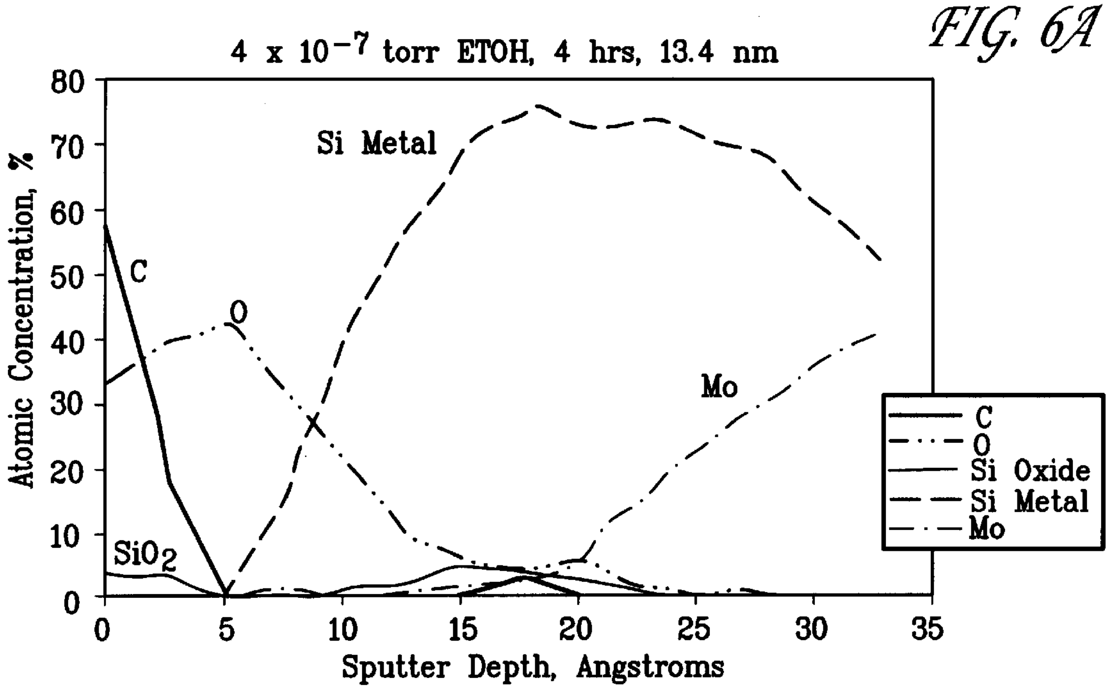
FIGS. 6A–6B show the self-limiting nature of the described coatings.
Figure 6B:
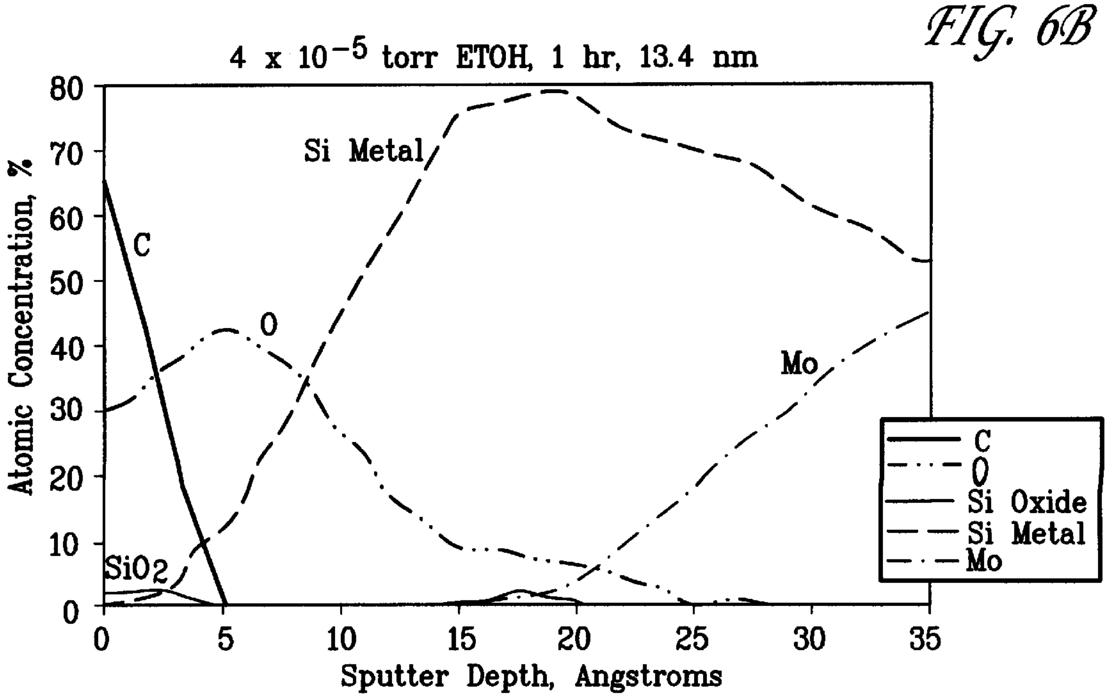

This example illustrates the self-limiting nature of the coatings produced by the present process. In FIG. 6A a spot on the surface of a Mo/Si mirror about 1 $mm^2$ was exposed to monochromatic 13.4 nm radiation at an energy density of about 7 $mW/mm^2$ in the presence of $4\times10^{-7}$ Torr of ethanol vapor for about 4 hours to form a carbon layer having a thickness of about 5 Å. Subsequently, a different region of the mirror surface was exposed to ethanol vapor, however, in this case the ethanol vapor concentration was two orders of magnitude higher ($4\times10^{-5}$ Torr). In this instance, the radiation exposure time was for about 1 hr. The results of this second exposure are shown in FIG. 6B. While the integrated exposure (ethanol vapor pressure×radiation exposure time) in the second exposure was 25 times greater, the thickness of the carbon layer remains the same (about 5 Å). It is believed that this self-terminating phenomenon arises from the inability of the ethanol molecules to bond to the carbon layer once the layer had grown to a thickness of about 5 Å. As a result, further radiative dissociation of ethanol by secondary electrons emitted from the surface and building up of the carbon layer is prevented.

The method described here is capable of producing films that are very smooth. By way of example, a carbon film having a thickness of about 10 Å was produced by exposing a Mo/Si optic to 2 kV electrons and $2\times10^{-7}$ Torr ethanol for about 2 hrs. Atomic Force Microscopy (AFM) measurements of an uncoated optic, polished by state-of-the-art optic polishing methods, showed a roughness of about 1.29 Å. AFM measurements of the carbon film revealed an rms roughness of about 1.34 Å.

The radiation-induced, self-limited coating process disclosed here is quiet general and flexible. Any number of molecular species ABX can be employed to provide carbon coatings. For binding to an oxide or hydroxy layer, such as might be found on a Si surface, it is preferred that the functional group X used to bind the ABX molecule to the substrate be a thiol (X=SH) group, a carboxyl (X=COOH) group, an ester (X=COOR) group, or an amine (X=N—H) group. A hydoxy (X=OH) group is particularly preferred. While ethanol was used in the examples above, similar types of coatings can be achieved using methanol ($CH_3OH$), propyl, or isopropyl alcohol ($CH_3(CH_2)_2OH$).

Possible compositions for the moiety AB would depend on the application. However, any chemical composition based on an organic framework such as (C, N, O, H) or an inorganic framework (for example Si-based) would be accommodated by the process of the invention disclosed here. Because application of the molecular species that is represented by ABX is typically by exposing a surface to the gas phase, it is preferred that the molecule ABX have a volatility similar to that of the low molecular weight alcohols.

The carbon coating process discussed here can also be used to coat a number of different substrates. For example glass ($SiO_2$) can be coated, since its surface is hydroxylated. Most metal surfaces have thin oxide layers that are generally hydroxylated, allowing direct application of the radiation-induced self-terminating carbon coating process described here to coating metal surfaces.

The use of radiation in the deposition process makes the technique highly flexible. The coating is applied only where radiation is striking a substrate. Coatings can therefore be applied in a controlled and spatially resolved manner. In particular, the lateral extent of the coating is limited only by the lateral extent of the radiation used to deposit the coating. Since electron beams can be focussed to atomic-scale dimensions, the spatial range of the coating technique ranges from square meters to square Angstroms, a dynamic range of 20 orders of magnitude in area.

A range of types of radiation may be used, although there may be some differences in the details of the deposition process depending on the type of radiation employed. For photons, the radiation need only be energetic enough to liberate secondary electrons, greater than about 4 eV. The same holds true for electrons and ions. It could be possible to activate the dissociation and coupling aspects of the coating technique using less energetic means, if dissociation and rearrangement could be accessed by direct molecular absorption of the incoming radiation, rather than by means of secondary electrons.

Further, the coatings produced by the method disclosed here can be easily removed by application of an RF discharge in the presence of oxygen. Summarizing, the process described here uses radiation and a gas phase species that is specifically adsorbed onto a surface to produce a protective coating that is self-limited in thickness, smooth at the Angstrom level, and substantially void-free on a molecular level. A specific example is given in which a 10 Å carbon coating is deposited on the Si-terminating surface of a Mo/Si mirror by adsorbing ethanol on the surface and exposing the adsorbed surface to a radiation flux, that can be either electrons or photons (13.4 nm radiation). The resulting coating, prevents the mirror from water-induced oxidation or degradation from atmospheric air exposure.

The above described process and the examples pertaining thereto are merely illustrative of applications of the principles of this invention and many other embodiments and modifications can be made by those of skill in the art without departing from the spirit and scope of the invention as defined in the claims.

I claim:

1. A process for producing a self-terminating and substantially void-free coating on surfaces, comprising:

a) providing a surface;

b) exposing the surface to a gas, wherein the gas comprises a molecular species having the general formula ABX, wherein X is a functional group that can bond the molecule to the surface, AB is that portion of the molecule not involved in the bonding process and capable of repetitive self-coupling; and c) exposing the surface to a radiation flux having an energy corresponding to at least about 4 eV.

2. The process of claim 1, wherein the gas is a hydrocarbon gas.

3. The process of claim 2, wherein X is selected from the group that includes thiol, carboxyl, ester, amine, and hydroxy.

4. The process of claim 2, wherein AB is methyl, ethyl, propyl, or isopropyl.

5. The process of claim 2, wherein ABX is methanol, ethanol, propanol, or is opropanol.

6. The process of claim 1, wherein the radiation is photons, electrons, or ions whose energies are greater than about 4 eV.

7. A surface having a coating produced by the process of any of claims 1–6, wherein the coating is self-terminating and substantially void-free.

8. The surface of claim 7, wherein the coating has a thickness of less than about 20 Å and an rms roughness of less than about 1.5 Å.

9. The process of claim 1, wherein the surface is a multilayer mirror.

10. The process of claim 1, wherein the coating has an rms roughness of less than about 1.5 Å.

* * * * *